(12) United States Patent
Kim et al.

(10) Patent No.: US 11,976,088 B2
(45) Date of Patent: May 7, 2024

(54) BORON-CONTAINING COMPOUND AND ELECTROLYTE SOLUTION ADDITIVE FOR SECONDARY BATTERY INCLUDING THE SAME

(71) Applicant: SK On Co., Ltd., Seoul (KR)

(72) Inventors: Myoung Lae Kim, Daejeon (KR); Chanwoo Kim, Daejeon (KR); Yu Na Shim, Daejeon (KR); Jaechan Ryu, Daejeon (KR); Cholho Lee, Daejeon (KR); Han Sol Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/078,671

(22) Filed: Dec. 9, 2022

(65) Prior Publication Data
US 2023/0183268 A1    Jun. 15, 2023

(30) Foreign Application Priority Data

Dec. 10, 2021    (KR) .................. 10-2021-0176192

(51) Int. Cl.
*C07F 5/02*    (2006.01)
*H01M 10/0567*    (2010.01)

(52) U.S. Cl.
CPC ......... *C07F 5/022* (2013.01); *H01M 10/0567* (2013.01); *H01M 2300/0025* (2013.01)

(58) Field of Classification Search
CPC ...................................... C07F 5/022
See application file for complete search history.

(56) References Cited

U.S. PATENT DOCUMENTS

| 3,267,126 A | 8/1966 | Weil |
| 10,535,898 B2 * | 1/2020 | Dubois ............. H01M 10/0567 |
| 2016/0164142 A1 | 6/2016 | Garsuch et al. |

FOREIGN PATENT DOCUMENTS

| CN | 106935904 B | 7/2019 |
| EP | 3764434 A1 | 1/2021 |
| JP | H08109260 A | 4/1996 |
| KR | 20180016486 A | 2/2018 |

OTHER PUBLICATIONS

W. Ried, W. Kunkel, and P. B. Olschewski. Synthesis of Substituted Cyclopentadienones by Ring Contraction. Angew. Chem. internat. Edit. vol. 8, 1969, No. 4. 275-276.

Extended European Search Report for the European Patent Application No. 22212633.6 issued by the European Patent Office dated Apr. 26, 2023.

* cited by examiner

*Primary Examiner* — Golam M Shameem
(74) *Attorney, Agent, or Firm* — IP & T GROUP LLP

(57) ABSTRACT

Provided are a novel boron-containing compound and an electrolyte solution additive for a secondary battery including the same. The electrolyte solution for a secondary battery provided in one embodiment includes the novel boron-containing compound, thereby suppressing the decomposition of an electrolyte solution to improve the capacity and the life characteristics of a battery.

13 Claims, 3 Drawing Sheets

BORON-CONTAINING COMPOUND AND ELECTROLYTE SOLUTION ADDITIVE FOR SECONDARY BATTERY INCLUDING THE SAME

CROSS-REFERENCE TO RELATED APPLICATIONS

This application claims priority under 35 U.S.C. § 119 to Korean Patent Application No. 10-2021-0176192, filed on Dec. 10, 2021, in the Korean Intellectual Property Office, the disclosure of which is incorporated herein by reference in its entirety.

TECHNICAL FIELD

The following disclosure relates to a novel boron-containing compound and an electrolyte solution additive for a secondary battery.

BACKGROUND

Since a lithium secondary battery has higher energy density than other batteries and allows for small size and light weight, it is highly likely to be used as a power supply of portable electronic devices. A lithium secondary battery may include a positive electrode, a negative electrode, and an electrolyte solution.

Recently, as a demand for a secondary battery having high power and high capacity like a secondary battery for automobiles increases, it is necessary to develop a lithium secondary battery provided with an electrolyte solution which may secure high thermal and chemical stability to improve ignition or explosion.

SUMMARY

An embodiment is directed to providing a novel compound containing boron.

Another embodiment is directed to providing an electrolyte solution additive for a secondary battery including a boron-containing compound.

Still another embodiment is directed to providing an electrolyte solution including the electrolyte solution additive for a secondary battery, and a secondary battery including the same.

In one general aspect, a compound represented by the following Chemical Formula 1 is provided:

[Chemical Formula 1]

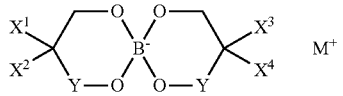

[Chemical Formula 2]

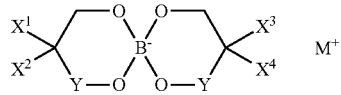

wherein $X^1$ and $X^3$ are independently of each other a substituted or unsubstituted compound represented by the above Chemical Formula 2;

$X^2$ and $X^4$ are independently of each other hydrogen, halogen, substituted or unsubstituted $C_{1-15}$ alkyl, substituted or unsubstituted $C_{2-15}$ alkenyl, or the substituted or unsubstituted compound represented by the above Chemical Formula 2;

n and m are independently of each other an integer of 0 to 15, and A is a bond or —C(=O)—;

Y is independently of each other —CH$_2$— or —CH$_2$CH$_2$—; and

M is an alkali metal.

In another general aspect, an electrolyte solution additive for a secondary battery includes a compound represented by the following Chemical Formula 1:

[Chemical Formula 1]

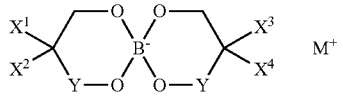

wherein $X^1$, $X^2$, $X^3$, $X^4$, Y, and M are as defined above.

In another general aspect, an electrolyte solution for a secondary battery includes the electrolyte solution additive for a secondary battery.

In still another general aspect, a secondary battery includes the electrolyte solution for a secondary battery.

Other features and aspects will be apparent from the following detailed description, the drawings, and the claims.

DETAILED DESCRIPTION OF EMBODIMENTS

Figure 1:
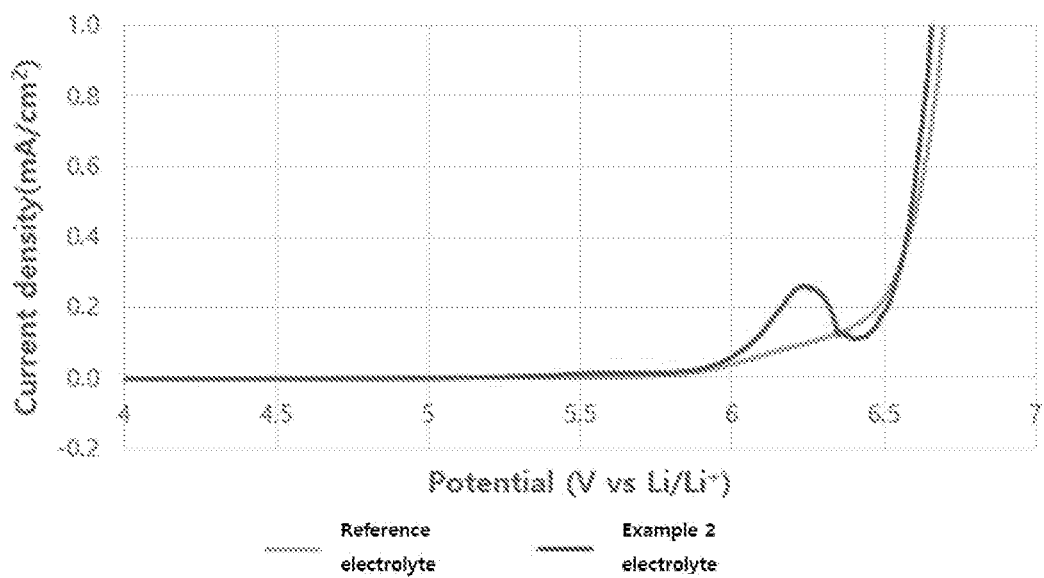
FIG. 1 is a drawing showing results of measuring a decomposition initiation voltage of the electrolyte solution according to Example 2 including the compound according to Example 1 by linear sweep voltammetry analysis.

The embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. Furthermore, unless explicitly described otherwise, "comprising" any components will be understood to imply the inclusion of other components but not the exclusion of any other components.

One embodiment provides a compound represented by the following Chemical Formula 1:

[Chemical Formula 1]

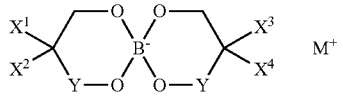

[Chemical Formula 2]

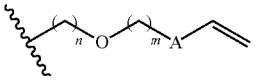

wherein

X¹ and X³ are independently of each other a substituted or unsubstituted compound represented by the above Chemical Formula 2;

X² and X⁴ are independently of each other hydrogen, halogen, substituted or unsubstituted $C_{1-15}$ alkyl, substituted or unsubstituted $C_{2-15}$ alkenyl, or the substituted or unsubstituted compound represented by the above Chemical Formula 2;

n and m are independently of each other an integer of 0 to 15, and A is a bond or —C(=O)—;

Y is independently of each other —CH$_2$— or —CH$_2$CH$_2$—; and

M is an alkali metal.

Here, "substituted" may be being independently of each other substituted by one or more of —OH, —CN, —NH$_2$, —NO$_2$, halogen, straight chain or branched chain $C_{1-20}$ alkyl, straight chain or branched chain $C_{1-20}$ alkylamino, straight chain or branched chain $C_{2-20}$ alkenyl, straight chain or branched chain $C_{1-20}$ alkoxy, straight chain or branched chain $C_{1-20}$ alkylcarbonyl, $C_{3-20}$ cycloalkyl, 3- to 10-membered heterocycloalkyl containing one or more heteroatoms selected from the group consisting of N, O, and S, $C_{5-20}$ aryl, and 5- to 10-membered heteroaryl containing one or more heteroatoms selected from the group consisting of N, O, and S, but is not necessarily limited thereto.

In one embodiment, X¹ and X³ may be independently of each other the substituted or unsubstituted compound represented by Chemical Formula 2;

X² and X⁴ may be independently of each other hydrogen, halogen, substituted or unsubstituted $C_{1-10}$ alkyl, substituted or unsubstituted $C_{2-10}$ alkenyl, or the substituted or unsubstituted compound represented by Chemical Formula 2;

n and m may be independently of each other an integer of 0 to 10, and A may be a bond; and Y may be independently of each other a bond or —CH$_2$—.

X² and X⁴ may be independently of each other substituted or unsubstituted $C_{1-8}$ alkyl, substituted or unsubstituted $C_{1-5}$ alkyl, substituted or unsubstituted $C_{1-3}$ alkyl, substituted or unsubstituted $C_{2-8}$ alkyl, substituted or unsubstituted $C_{2-6}$ alkenyl, substituted or unsubstituted $C_{2-5}$ alkenyl, or substituted or unsubstituted $C_{2-3}$ alkenyl. Here, the alkenyl includes the case in which an unsaturated carbon is directly connected or an unsaturated carbon is connected via alkylene. For example, the unsaturated carbon may exist at the very end of a chain.

n and m may be independently of each other an integer of 0 to 8, an integer of 0 to 3, an integer of 0 to 2, or 0, 1, or 2.

Otherwise, the compound represented by Chemical Formula 2 may be

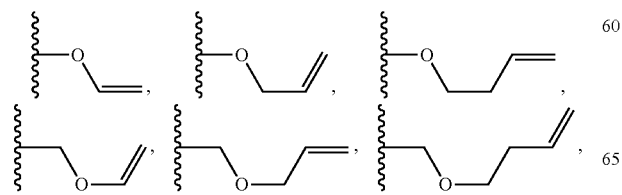

-continued

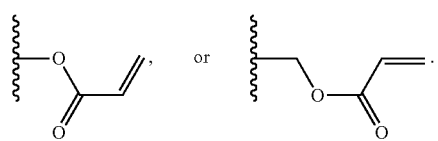

M may be lithium, sodium, potassium, or cesium.

The compound represented by Chemical Formula 1 may be any one selected from the group consisting of compounds represented by the following Chemical Formulae:

(1)
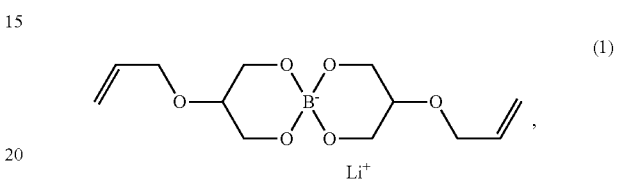

(2)
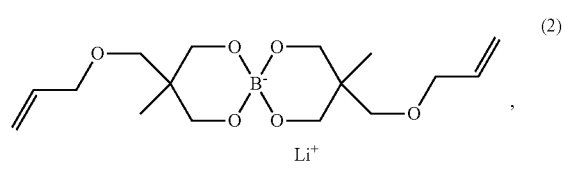

(3)
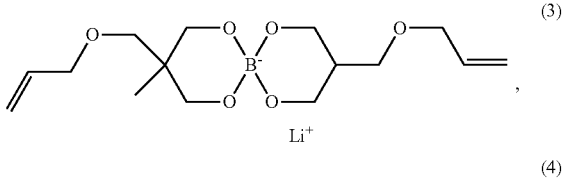

(4)
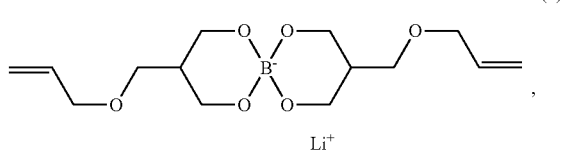

(5)
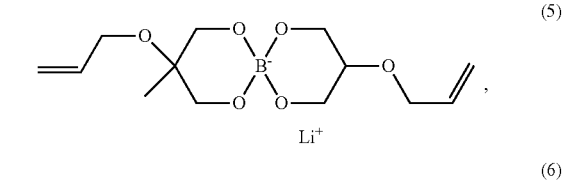

(6)
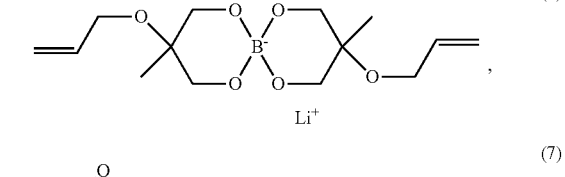

(7)
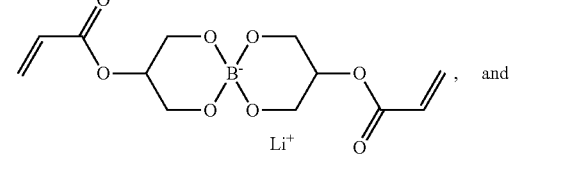
, and (8)
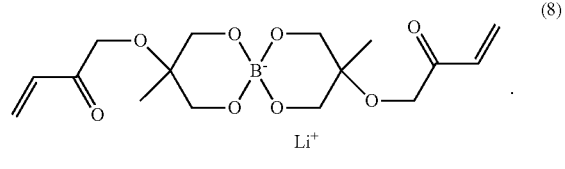

Another embodiment provides an electrolyte solution additive for a secondary battery including a compound represented by the following Chemical Formula 1:

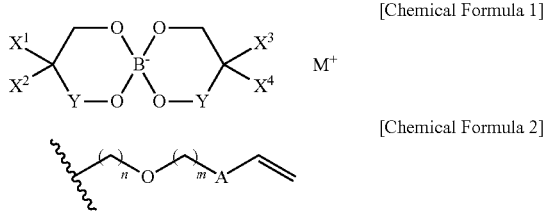

[Chemical Formula 1]

[Chemical Formula 2]

wherein $X^1$ and $X^3$ are independently of each other a substituted or unsubstituted compound represented by the above Chemical Formula 2;

$X^2$ and $X^4$ are independently of each other hydrogen, halogen, substituted or unsubstituted $C_{1-15}$ alkyl, substituted or unsubstituted $C_{2-15}$ alkenyl, or the substituted or unsubstituted compound represented by the above Chemical Formula 2;

n and m are independently of each other an integer of 0 to 15, and A is a bond or —C(=O)—;

Y is independently of each other —$CH_2$— or —$CH_2CH_2$—; and

M is an alkali metal.

Here, the above descriptions may apply to $X^1$, $X^2$, $X^3$, $X^4$, Y, and M.

The electrolyte solution additive for a secondary battery may include an oligomer, a polymer, a polymerization initiator, a solvent, and the like, prepared from a monomer, using the compound represented by Chemical Formula 1 as the monomer. The oligomer may be bonded through a polymerization reaction to form a network.

The oligomer or the polymer prepared from the monomer may have a weight average molecular weight of, for example, about 1,000 to 30,000, about 1,000 to 25,000, about 1,000 to 20,000, about 5,000 to 20,000, but is not necessarily limited thereto.

The compound represented by Chemical Formula 1 may be included at 0.01 to 30 wt %, 0.01 to 20 wt %, 0.01 to 10 wt %, 0.05 to 20 wt %, 0.1 to 20 wt %, 0.1 to 15 wt %, 0.1 to 10 wt %, or 1 to 10 wt % with respect to the total weight of the electrolyte solution additive for a secondary battery, but is not necessarily limited thereto.

The polymerization initiator may be used for forming a polymer by polymerizing the monomer or the oligomer, and a common polymerization initiator known in the art may be used without limitation. For example, a photopolymerization initiator or a thermal polymerization initiator may be used depending on a polymerization method, and specifically, for example, the photopolymerization initiator may include at least one or more selected from the group consisting of 2-hydroxy-2-methylpropiophenone (HMPP), 1-hydroxy-cyclohexylphenyl-ketone, benzophenone, 2-hydroxy-1-[4-(2-hydroxyethoxy)phenyl]-2-methyl-1-propanone, oxy-phenylacetic acid 2-[2-oxo-2-phenyl-acetoxy-ethoxy]-ethyl ester, oxy-phenyl-acetic 2-[2-hydroxyethoxy]-ethyl ester, α-dimethoxy-α-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, bis(2,4,6-trimethyl benzoyl)-phenyl phosphine oxide, bis(eta-5-2,4-cyclopentediene-1-yl), bis[2,6-difluoro-3-(1H-pyrrole-1-yl)phenyl]titanium, 4-isobutylphenyl-4'-methylphenyliodonium hexafluorophosphate, and methyl benzoylformate, and the thermal polymerization initiator may include at least one or more selected from the group consisting of benzoyl peroxide, acetyl peroxide, dilauroyl peroxide, di-tert-butylperoxide, t-butyl peroxy-2-ethyl-hexanoate, cumyl hydroperoxide, hydrogen peroxide, 2,2'-azobis(2-cyanobutane), 2,2'-azobis'(methylbutyronitrile), 2,2'-azobis(iso-butyronitrile) (AIBN), and 2,2-azobisdimethyl-valeronitrile (AMVN), as a representative example.

The solvent is not particularly limited as long as it is an electrolyte solution solvent commonly used in secondary batteries, and for example, ethers, esters (such as acetates and propionates), amides, linear carbonates or cyclic carbonates, nitriles (such as acetonitrile and SN), and the like may be used alone or in combination or two or more.

The ester compound may include methyl acetate, ethyl acetate, n-propyl acetate, dimethyl acetate, methyl propionate, ethyl propionate, γ-butyrolactone, decanolide, valerolactone, mevalonolactone, caprolactone, methyl formate, and the like.

The linear carbonate compound may include, for example, diethyl carbonate (DEC), dimethyl carbonate (DMC), dipropyl carbonate (DPC), methylpropyl carbonate (MPC), ethylpropyl carbonate (EPC), ethylmethyl carbonate (EMC), or a combination thereof, and the cyclic carbonate compound may include, for example, ethylene carbonate (EC), propylenecarbonate (PC), butylene carbonate (BC), vinylethylene carbonate (VEC), or a combination thereof.

Another embodiment provides an electrolyte solution for a secondary battery including the electrolyte solution additive for a secondary battery.

The electrolyte solution for a secondary battery may further include other additives known in the art, inorganic particles, and the like for increasing efficiency and decreasing resistance of a secondary battery.

For example, an oxalatophosphate-based additive, an oxalatoborate-based compound, a fluorine-substituted carbonate-based compound, a vinylidene carbonate-based compound, or a sulfinyl group-containing compound may be included as other additives. Otherwise, for example, lithium tetrafluoro(oxalato)phosphate (LiTFOP), lithium difluorobis (oxalato)phosphate (LiDFOP), lithium difluorooxalatoborate (LiDFOB), lithium bisoxalatoborate (LiB($C_2O_4$)$_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, or propene sultone (PRS) may be included. In one embodiment, the compound or an oligomer including the compound as a monomer may be further reacted with other additives in an electrolyte solution.

The oxalatoborate-based compound may be a compound represented by the following Chemical Formula 3 or lithium bisoxalatoborate (LiB($C_2O_4$)$_2$, LiBOB):

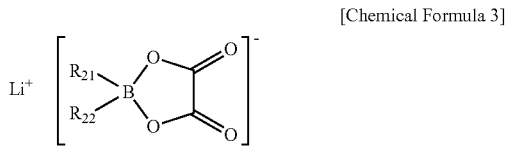

[Chemical Formula 3]

wherein $R_{21}$ an $R_{22}$ are independently of each other halogen or halo$C_{1-10}$ alkyl. A specific example of the oxalatoborate-based additive may include LiB(C$_2$O$_4$)F$_2$ (lithiumdifluorooxalatoborate, LiDFOB), LiB(C$_2$O$_4$)$_2$ (lithiumoxalatoborate, LiBOB), or the like.

The oxalatophosphate-based additive may be a compound represented by the following Chemical Formula 4 or lithium difluorobis(oxalato)phosphate (LiDFOP).

[Chemical Formula 4]

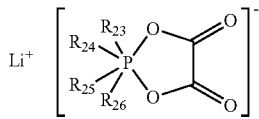

wherein R$^{23}$ to R$^{26}$ are independently of each other halogen or haloC$_{1-10}$ alkyl. A specific example of the oxalatophosphate-based additive may include lithium tetrafluoro(oxalato)phosphate (LiTFOP), lithium difluoro bis(oxalato)phosphate (LiDFOP), or the like.

The fluorine-substituted carbonate-based compound may be fluoroethylene carbonate (FEC), difluoroethylene carbonate (DFEC), fluorodimethyl carbonate (FDMC), fluoroethylmethyl carbonate (FEMC), or a combination thereof.

The vinylidene carbonate-based compound may be vinylene carbonate (VC), vinyl ethylene carbonate (VEC), or a mixture thereof.

The sulfinyl group (S=O)-containing compound may be sulfone, sulfite, sulfonate, or sultone (cyclic sulfonate), and these may be used alone or in combination.

Specifically, the sulfone may be represented by the following Chemical Formula 5, and may be divinyl sulfone. The sulfite may be represented by the following Chemical Formula 6, and may be ethylene sulfite or propylene sulfite. The sulfonate may be represented by following Chemical Formula 7, and may be diallyl sulfonate. In addition, a non-limiting example of sultone may include ethane sultone, propane sultone, butane sultone, ethene sultone, butene sultone, propene sultone, and the like.

[Chemical Formula 5]

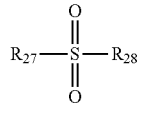

[Chemical Formula 6]

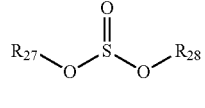

[Chemical Formula 7]

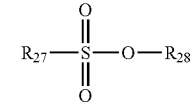

wherein R$_{27}$ and R$_{28}$ are independently of each other hydrogen, halogen, C$_{1-10}$ alkyl, C$_{2-10}$ alkenyl, haloC$_{1-10}$ alkyl, or haloC$_{2-10}$ alkenyl.

As the inorganic particles, a single compound selected from the group consisting of BaTiO$_3$, Pb(Zr,Ti)O$_3$ (PZT), Pb$_{1-a}$La$_a$Zr$_{1-b}$TibO$_3$ (PLZT, wherein 0<a<1, 0<b<1), Pb(Mg$_{1/3}$Nb$_{2/3}$)O$_3$—PbTiO$_3$ (PMN-PT), hafnia (HfO$_2$), SrTiO$_3$, SnO$_2$, CeO$_2$, MgO, NiO, CaO, ZnO, ZrO$_2$, Y$_2$O$_3$, Al$_2$O$_3$, TiO$_2$, SiC, and a mixed body thereof or a mixture of two or more thereof, lithium phosphate (Li$_3$PO$_4$), lithium titanium phosphate (Li$_c$Ti$_d$(PO$_4$)$_3$, 0<c<2, 0<d<3), lithium aluminum titanium phosphate (Li$_{a1}$Al$_{b1}$Ti$_{c1}$(PO$_4$)$_3$, 0<a1<2, 0<b1<1, 0<c1<3), (LiAlTiP)$_{a2}$O$_{b2}$-based glass (0<a2<4, 0<b2<13) such as 14Li$_2$O-9Al$_2$O$_3$-38TiO$_2$-39P$_2$O$_5$, lithium lanthanum titanate (Li$_{a3}$La$_{b3}$TiO$_3$, 0<a3<2, 0<b3<3), lithium germanium thiophosphate (Li$_{a4}$Ge$_{b4}$P$_{c2}$S$_d$, 0<a4<4, 0<b4<1, 0<c2<1, 0<d<5) such as Li$_{3.25}$Ge$_{0.25}$P$_{0.75}$S$_4$, lithium nitride (Li$_{a5}$N$_{b5}$, 0<a5<4, 0<b5<2) such as Li$_3$N, SiS$_2$-based glass (Li$_{a6}$Si$_{b6}$S$_{c3}$, 0<a6<3, 0<b6<2, 0<c3<4) such as Li$_3$PO$_4$—Li$_2$SSiS$_2$, P$_2$S$_5$-based glass (Li$_{a7}$P$_{b7}$S$_{c5}$, 0<a7<3, 0<b7<3, 0<c5<7) such as LiI—Li$_2$S—P$_2$S$_5$, or mixtures thereof, and the like may be used.

In one embodiment, the additive or the inorganic particles may be included at 0.1 wt % to 20 wt % with respect to the total weight of the electrolyte solution, but is not necessarily limited thereto.

The electrolyte solution may be formed by polymerizing the compound according to a common method known in the art. For example, a composition including the compound as an additive may be prepared by performing in-situ polymerization, coating polymerization, or the like. The composition for a secondary battery provided in one embodiment has excellent high-temperature stability and ion conductivity, so that it may be efficiently used in a secondary battery.

The compound according to one embodiment included in the additive is formed on the surface of an electrode to prevent a direct contact between the electrode and an electrolyte solution, so that a side reaction between the electrode and the electrolyte solution at a high temperature may be suppressed, and an electrode life may be improved due to the suppression of cracks of SEI by the shrinkage and expansion of the electrode during charging and discharging. That is, since the compound according to one embodiment may form thermally stable SEI on the surface of an electrode, a battery adopting the electrolyte solution according to one embodiment may have excellent storage characteristics and excellent thermal stability.

Another embodiment provides a protective film of an electrode including the compound or the electrolyte solution additive for a secondary battery including the same. Therefore, the use of the compound according to one embodiment is not necessarily limited only to the additive added to an electrolyte solution, the compound may be also used for forming a protective film in a secondary battery, and the protective film may be formed on the surface of the electrode or an electrode current collector to be used for suppressing the further decomposition of the electrolyte solution or improving a battery life. For example, it may be used as a layer for protecting a dendrite, and the layer may be a gel-polymer film. Thus, the cycle characteristics of a secondary battery electrode may be improved to improve the performance and the life of a battery.

Another embodiment provides a secondary battery including the electrolyte solution for a secondary battery.

A negative electrode included in the secondary battery includes a negative electrode current collector and a negative electrode active material layer formed on the negative electrode current collector, and the negative electrode active material layer includes a negative electrode active material. The negative electrode active material is not particularly limited as long as it is commonly used in the art. For example, it may be a silicon-based negative electrode active material or carbon-based negative electrode active material. Specifically, it may include graphite such as natural graphite, artificial graphite, and expanded graphite, crystalline carbon such as graphene, fullerene soot, carbon nanotubes, and carbon fiber, and amorphous carbon such as soft carbon (low temperature baked carbon), hard carbon, coke, mesocarbon microbeads (MCMB) baked at 1500° C. or lower, and mesophase pitch-based carbon fiber (MPCF). Otherwise, it may include a material selected from Si, SiO$_x$ (0<x<2), Si—Z alloy (wherein Z is an alkali metal, an alkaline earth metal, a Group 13 element, a Group 14 element, a Group 15 element, a Group 16 element, a transition metal, a rare earth element, or a combination thereof, and Si is excluded from Z), and a combination thereof. Element Z may be selected from the group consisting of Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and combinations thereof. In addition, the silicon-based negative electrode active material such as Si, SiO$_x$, and Si—Z alloy may substantially include crystalline (including monocrystalline and polycrystalline), amorphous, or a mixed form thereof. In addition, the negative electrode may further include a compound commonly used as a negative electrode active material.

A positive electrode included in the secondary battery includes a positive electrode current collector and a positive electrode active material layer formed on the positive electrode current collector, and the positive electrode active material layer includes a positive electrode active material. The positive electrode active material is not particularly limited as long as it is commonly used in the art. For example, it may include a positive electrode active material capable of adsorbing or desorbing a lithium ion, and as the positive electrode active material, those commonly used in the art as a lithium-containing metal oxide may be used without limitation. For example, a composite metal oxide of a metal selected from cobalt, manganese, nickel, and a combination thereof with lithium may be used.

A specific example of the positive electrode active material may include a compound represented by any one of the following chemical formulae: $Li_aA_{1-b}B_bD_2$ (wherein 0.90≤a≤1.8, and 0≤b≤0.5); $Li_aE_{1-b}B_bO_{2-c}D_c$ (wherein 0.90≤a≤1.8, 0≤b≤0.5, and 0≤c≤0.05); $LiE_{2-b}B_bO_{4-c}D_c$ (wherein 0≤b≤0.5 and 0≤c≤0.05); $Li_aNi_{1-b-c}Co_bB_cD_\alpha$ (wherein 0.90≤a≤1.8, 0≤b≤0.5, 0≤c≤0.05, and 0<α≤2); $Li_aNi_{1-b-c}Co_bB_cO_{2-\alpha}F_\alpha$ (wherein 0.90≤a≤1.8, 0≤b≤0.5, 0≤c≤0.05, and 0<α<2); $Li_aNi_{1-b-c}Co_bB_cO_{2-\alpha}F_2$ (wherein 0.90≤a≤1.8, 0≤b≤0.5, 0≤c≤0.05, and 0<α<2); $Li_aNi_{1-b-c}Mn_bB_cD_\alpha$ (wherein 0.90≤a≤1.8, 0≤b≤0.5, 0≤c≤0.05, and 0<α<2); $Li_aNi_{1-b-c}Mn_bB_cO_{2-\alpha}F_\alpha$ (wherein 0.90≤a≤1.8, 0≤b≤0.5, 0≤c≤0.05, and 0<α<2); $Li_aNi_{1-b-c}Mn_bB_cO_{2-\alpha}F_2$ (wherein 0.90≤a≤1.8, 0≤b≤0.5, 0≤c≤0.05, and 0<α<2); $Li_aNi_bE_cG_dO_2$ (wherein 0.90≤a≤1.8, 0≤b≤0.9, 0≤c≤0.5, and 0.001≤d≤0.1); $Li_aNi_bCo_cMn_dGeO_2$ (wherein 0.90≤a≤1.8, 0≤b≤0.9, 0≤c≤0.5, 0≤d≤0.5, and 0.001≤e≤0.1); $Li_aNiG_bO_2$ (wherein 0.90≤a≤1.8 and 0.001≤b≤0.1); $Li_aCoG_bO_2$ (wherein 0.90≤a≤1.8 and 0.001≤b≤0.1); $Li_aMnG_bO_2$ (wherein 0.90≤a≤1.8 and 0.001≤b≤0.1); $Li_aMn_2G_bO_4$ (wherein 0.90≤a≤1.8 and 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above Chemical Formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof. For example, it may be $LiCoO_2$, $LiMn_xO_{2X}$ (x=1, 2), $LiNi_{1-x}Mn_xO_{2X}$ (0<x<1), $LiNi_{1-x-y}Co_xMn_yO_2$ (0≤x≤0.5, 0≤y≤0.5), $FePO_4$, or the like.

The positive electrode or the negative electrode may be produced by dispersing an electrode active material, a binder, a conductive material, or a thickener in a solvent to prepare an electrode slurry composition, and applying the slurry composition on an electrode current collector. As a positive electrode current collector, aluminum, an aluminum alloy, or the like may be often used, and as a negative electrode current collector, copper, a copper alloy, or the like may be often used. The positive electrode current collector and the negative electrode current collector may be in the form of foil or mesh.

The secondary battery provided in one embodiment includes the electrolyte solution for a secondary battery, so that sufficient performance may be exerted even at a high temperature, and suppresses the production of volatile materials, so that an effect of suppressing a battery thickness increase may be obtained. In addition, low-resistance characteristics of an electrode are improved, and a battery life may be increased. The secondary battery according to one embodiment may be formed in other shapes such as cylindrical and pouch shapes, in addition to a prismatic shape. The secondary battery may be used for an application requiring high voltage, high power, and high-temperature operation, such as an electric vehicle, in addition to the conventional uses such as a mobile phone or a portable computer. In addition, the secondary battery may be combined with conventional internal combustion engines, fuel cells, supercapacitors, and the like to be also used in a hybrid vehicle and the like, and may be used in electric bicycles, machine tools, and other uses requiring high power, high voltage, and high-temperature operation.

Hereinafter, the examples and the experimental examples will be illustrated in detail. However, the examples and the experimental examples described later are only illustrative of a part of the present disclosure, and the present disclosure is not limited thereto.

<Example 1> Preparation of Compound a

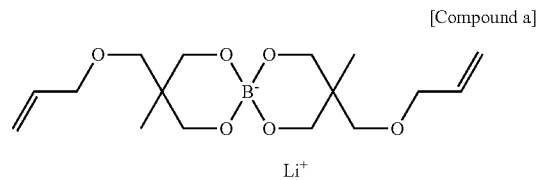 [SMILES: C=CCOCC1(C)CO[B-]2(OC1)OCC(C)(COCC=C)CO2 ; [Li+]]

[Compound a]

Li$^+$

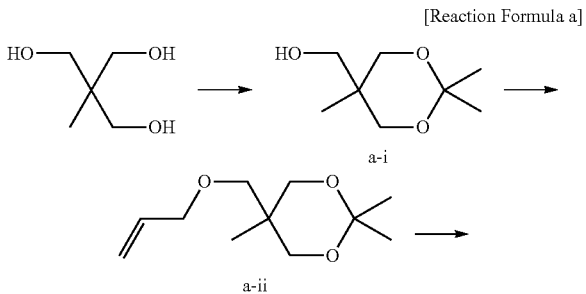

[Reaction Formula a]

-continued

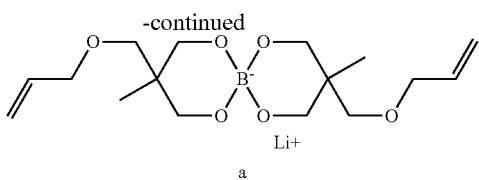

a

Step 1:
To a 250 mL round bottom flask, 1,1,1-tris(hydroxymethyl)ethane (10 g, 83.22 mmol), 2,2-dimethoxypropane (8.66 g, 83.22 mmol), p-TsOH (158 mg, 0.8 mmol), and acetone (80 mL) were added, and were stirred at room temperature for 5 hours. Next, a $K_2CO_3$ solution was added to a reaction solution, a produced solid was removed by filtration, the solvent of the filtrate was all removed, hexane was added, a produced solid was removed by filtration, and then the solvent of the filtrate was all removed to obtain 13 g of compound a-i.
$^1$H NMR (500 MHz, DMSO-$d_6$) δ=4.55 (t, J=5.3 Hz, 1H), 3.57 (d, J=11.6 Hz, 2H), 3.43 (d, J=11.6 Hz, 2H), 3.36 (d, J=5.3 Hz, 2H), 1.33 (s, 3H), 1.27 (s, 3H), 0.76 (s, 3H).

Step 2:
To a 2-neck 250 mL round bottom flask, a magnetic bar, NaH (2.8 g, 115 mmol), and anhydrous THF (180 mL) were added, and were stirred at 0° C. under $N_2$. Compound a-i (13.2 g, 82.5 mmol) prepared in step 1 was dissolved in anhydrous THF (180 mL), the solution was slowly added to a reaction vessel, and stirring was performed at 0° C. under $N_2$. When hydrogen generation was finished, allyl bromide (8.6 mL, 99 mmol) was added at 0° C., and after completing the addition, the temperature was raised to room temperature and stirring was performed overnight. Next, $NH_4Cl$ was added to the reaction solution, extraction was performed 6 times with ethyl acetate (EA), and moisture was removed with $MgSO_4$ from the extracted solution and the solvent was removed therefrom. Next, column purification was performed to obtain 10 g of compound a-ii as an intermediate in a yield of 61%.
$^1$H NMR (500 MHz, DMSO-$d_6$) δ=5.86 (m, 1H), 5.25 (m, 1H), 5.13 (m, 1H), 3.93 (m, 2H), 3.56 (d, J=12 Hz, 2H), 3.47 (d, J=11.6 Hz, 2H), 3.35 (s, 2H), 1.33 (s, 3H), 1.27 (s, 3H), 0.81 (s, 3H).

Step 3:
To a 25 mL round bottom flask, compound a-ii (0.72 g, 3.6 mmol) prepared in step 2, a magnetic bar, and a DOWEX resin were added, dissolved in MeOH (4 mL), and stirred at room temperature for 2 hours, and after the reaction was completed, the DOWEX resin was removed by a filter, and the solvent of the obtained solution was all removed. To a 10 mL round bottom flask, LiOH (43 mg, 1.8 mmol), a reaction solution in which boric acid (111 mg, 1.8 mmol) was dissolved in water, and a reactant concentrated by removing the solvent after filtration with the reaction solution dissolved in water, and a magnetic bar were added, and were stirred at room temperature for 3 hours. Next, toluene was added to the reaction solution, and the solvent was removed by azeotropy 3 times to obtain a solid, which was cleaned with hexane to obtain 371 mg of compound a of Example 1 in a yield of 32%.
$^1$H NMR (500 MHz, DMSO-$d_6$) δ=5.88 (m, 2H), 5.23 (m, 2H), 5.10 (m, 2H), 3.89 (m, 4H), 3.30 (m, 4H), 3.22 (m, 8H), 0.57 (s, 6H).

<Example 2> Preparation of Electrolyte Solution

In a mixed solution of ethylene carbonate (EC) and ethylmethyl carbonate (EMC) at a weight ratio of 3:7, $LiPF_6$ was dissolved at a concentration of 1.0 M, and 1 wt % of the compound according to Example 1 was added to prepare the electrolyte solution according to Example 2.

<Experimental Example 1> Linear Sweep Voltammetry (LSV) Analysis of Electrolyte Solution The electrolyte solution according to Example 2 was tested by the following method, for measuring a decomposition initiation voltage through linear sweep voltammetry analysis, and an electrolyte solution which did not include compound a of Example 1 was used as a reference electrolyte solution. Specifically, a platinum electrode was used as a working electrode, lithium metal was used as a reference electrode and a counter electrode, and the measurement was performed at a scan speed of 0.1 mV/s in a voltage range of 3 V to 7 V. As a LSV measuring instrument, Multi-Channel Potentiostat (Ametek, Inc.) PMC-100 was used. The results are shown in FIG. 1.

As a result, as confirmed in FIG. 1, compound a according to Example 1 included in the electrolyte solution of Example 2 was decomposed near 6.1 V before the electrolyte solution solvent. Therefore, compound a according to Example 1 is decomposed before the electrolyte solution solvent in the electrolyte solution, thereby protecting the surface of the electrode, so that it may serve to improve a lifespan, improve properties at high temperature, and decrease resistance.

<Experimental Example 2> Cyclic Voltammetry (CV) Analysis of Electrolyte Solution The electrolyte solution according to Example 2 was tested by the following method, for measuring a current-voltage curve through voltammetry analysis. Specifically, graphite was used as a working electrode and lithium was used as a counter electrode and a reference electrode, CV measurement was performed for 3 cycles at a scan speed of 0.5 mV/s in a voltage range of 0 V to 3 V, and as a CV measuring instrument, Multi-Channel Potentiostat (Ametek, Inc.) PMC-100 was used. The results were illustrated in FIGS. 2 and 3.

Figure 2:
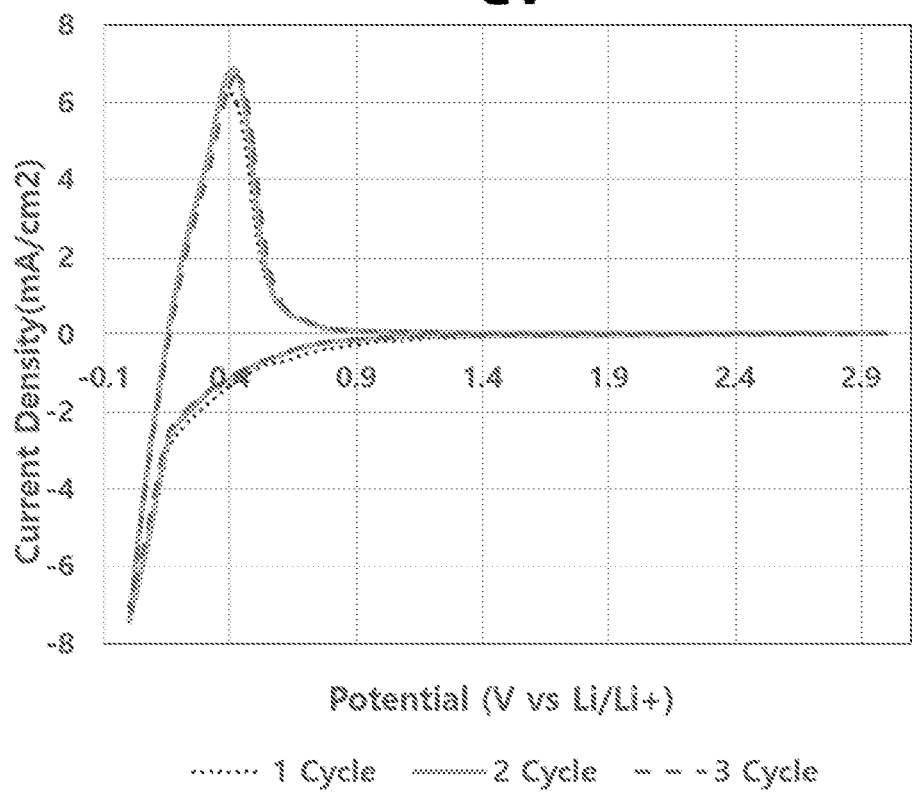
FIG. 2 is a drawing showing results of measuring a current-voltage curve of the electrolyte solution according to Example 2 including the compound according to Example 1 by voltammetry analysis.
Figure 3:
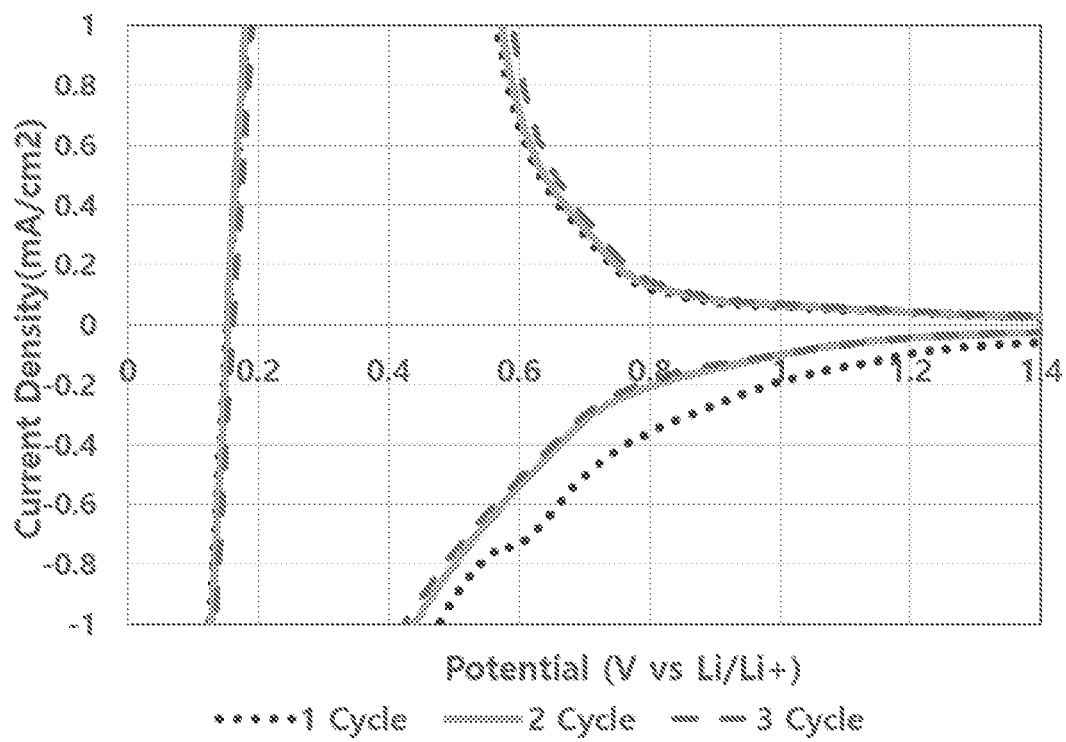
FIG. 3 is a drawing showing the same result graph as FIG. 2, but the graph is enlarged so that the decomposition near 0.6 V may be confirmed more clearly.

As a result, as confirmed in FIGS. 2 and 3, considering that the decomposition started from about 0.6 V before reaching 0.3 V as an electrolyte decomposition voltage at a first cycle, the decomposition of compound a according to Example 1 occurred first to form a solid electrolyte interphase (SEI). In addition, formation of a stable protective film may be confirmed by a smooth curve without additional decomposition shown in second and third cycles. Therefore, compound a according to Example 1 was decomposed before the electrolyte solvent in the electrolyte solution to form a protective film on the surface of the electrode, thereby suppressing the additional decomposition of the electrolyte solution, and thus, the low-resistance characteristics of the electrode may be improved and the battery life may be increased.

The present disclosure relates to a novel boron-containing compound and an electrolyte solution additive for a secondary battery including the same, and the electrolyte solution for a secondary battery provided in one embodiment includes the novel boron-containing compound, thereby suppressing the decomposition of an electrolyte solution to improve the capacity and the life characteristics of a battery.

Hereinabove, though the present disclosure has been described in detail by the preferred examples and experimental examples, the scope of the present disclosure is not limited to specific examples, and should be construed by the appended claims. In addition, it should be understood by a person skilled in the art that many modifications and variations are possible without departing from the scope of the present disclosure.

The invention claimed is:

1. A compound represented by the following Chemical Formula 1:

[Chemical Formula 1]

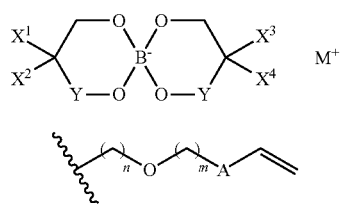

[Chemical Formula 2]

$$\text{\}\}\}-(\text{CH}_2)_n-O-(\text{CH}_2)_m-A-\text{CH=CH}_2$$

wherein
X$^1$ and X$^3$ are independently of each other a substituted or unsubstituted compound represented by the above Chemical Formula 2;
X$^2$ and X$^4$ are independently of each other hydrogen, halogen, substituted or unsubstituted C$_{1-15}$ alkyl, substituted or unsubstituted C$_{2-15}$ alkenyl, or the substituted or unsubstituted compound represented by the above Chemical Formula 2;
n and m are independently of each other an integer of 0 to 15, and A is a bond or —C(=O)—;
Y is independently of each other —CH$_2$— or —CH$_2$CH$_2$—; and
M is an alkali metal.

2. The compound of claim 1,
wherein X$^1$ and X$^3$ are independently of each other the substituted or unsubstituted compound represented by Chemical Formula 2;
X$^2$ and X$^4$ are independently of each other hydrogen, halogen, substituted or unsubstituted C$_{1-10}$ alkyl, substituted or unsubstituted C$_{2-10}$ alkenyl, or the substituted or unsubstituted compound represented by Chemical Formula 2;
n and m are independently of each other an integer of 0 to 10, and A is a bond; and
Y is independently of each other a bond or —CH$_2$—.

3. The compound of claim 1, wherein the compound represented by Chemical Formula 2 is any one selected from the group consisting of the following compounds:

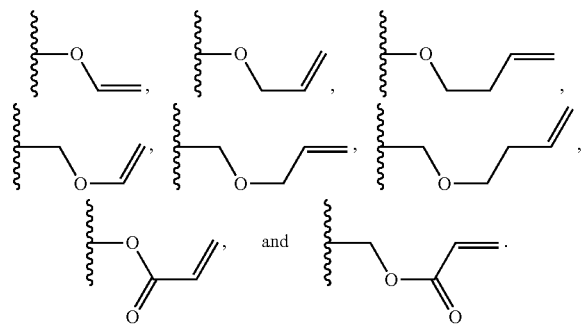

4. The compound of claim 1, wherein M is lithium, sodium, potassium, or cesium.

5. The compound of claim 1, wherein the compound represented by Chemical Formula 1 is any one selected from the group consisting of compounds represented by the following Chemical Formulae:

(1)
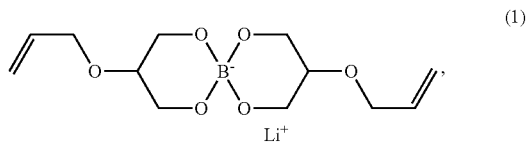

(2)
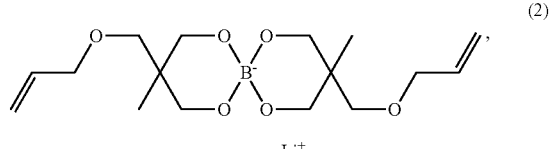

(3)
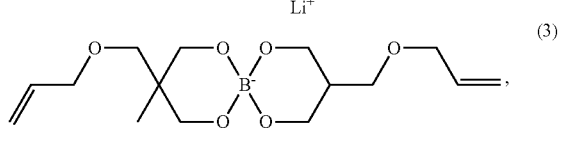

(4)
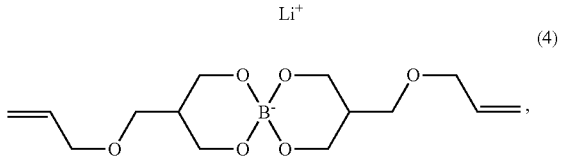

(5)
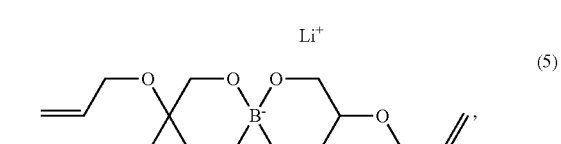

(6)
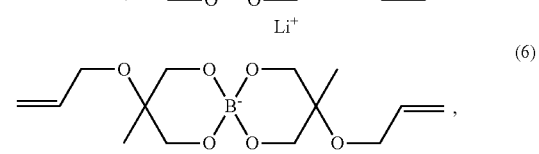

(7)
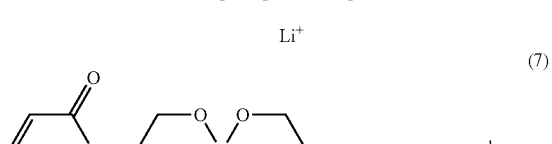

and (8)
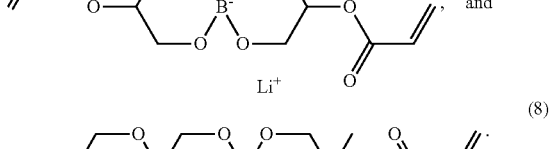

6. An electrolyte solution additive for a secondary battery comprising a compound represented by the following Chemical Formula 1:

[Chemical Formula 1]

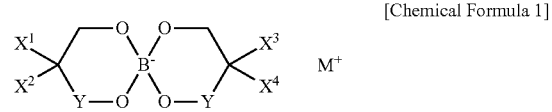

-continued

[Chemical Formula 2]

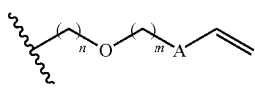

wherein
X$^1$ and X$^3$ are independently of each other a substituted or unsubstituted compound represented by the above Chemical Formula 2;
X$^2$ and X$^4$ are independently of each other hydrogen, halogen, substituted or unsubstituted C$_{1-15}$ alkyl, substituted or unsubstituted C$_{2-15}$ alkenyl, or the substituted or unsubstituted compound represented by the above Chemical Formula 2;
n and m are independently of each other an integer of 0 to 15, and A is a bond or —C(=O)—;
Y is independently of each other —CH$_2$— or —CH$_2$CH$_2$—; and
M is an alkali metal.

7. The electrolyte solution additive for a secondary battery of claim 6,
wherein X$^1$ and X$^3$ are independently of each other the substituted or unsubstituted compound represented by Chemical Formula 2;
X$^2$ and X$^4$ are independently of each other hydrogen, halogen, substituted or unsubstituted C$_{1-10}$ alkyl, substituted or unsubstituted C$_{2-10}$ alkenyl, or the substituted or unsubstituted compound represented by Chemical Formula 2;
n and m are independently of each other an integer of 0 to 10, and A is a bond; and
Y is independently of each other a bond or —CH$_2$—.

8. The electrolyte solution additive for a secondary battery of claim 6, wherein the compound represented by Chemical Formula 2 is any one selected from the group consisting of the following compounds:

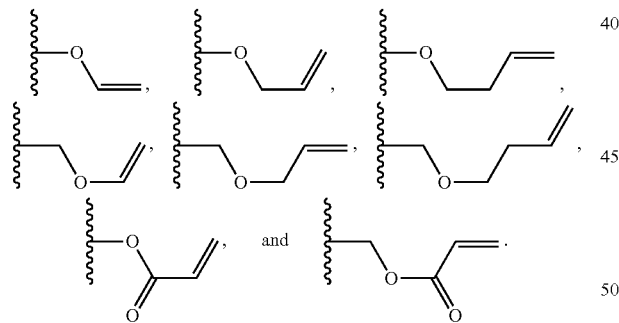

9. The electrolyte solution additive for a secondary battery of claim 6, wherein M is lithium, sodium, potassium, or cesium.

10. The electrolyte solution additive for a secondary battery of claim 6, wherein the compound represented by Chemical Formula 1 is any one selected from the group consisting of compounds represented by the following chemical formulae:

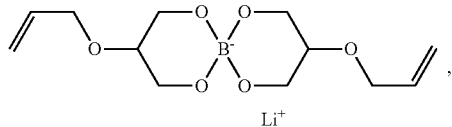
(1)

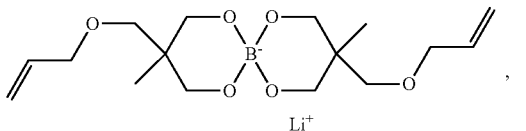
(2)

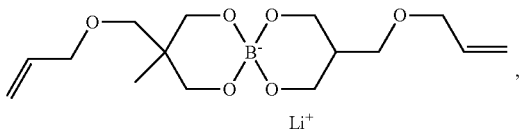
(3)

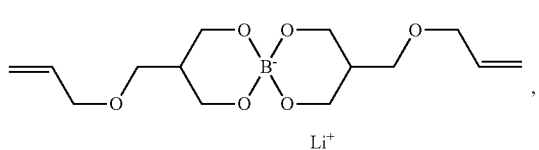
(4)

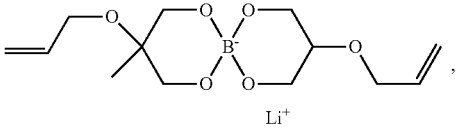
(5)

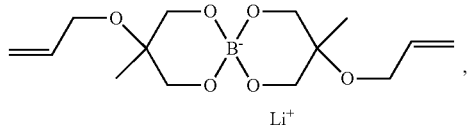
(6)

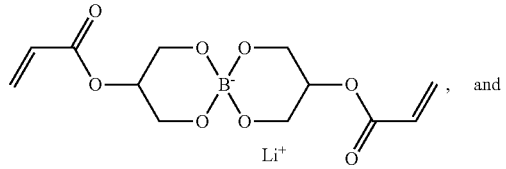
(7)

and

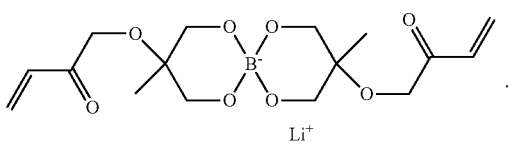
(8)

11. An electrolyte solution for a secondary battery comprising the electrolyte solution additive for a secondary battery of claim 6.

12. A protective film of an electrode comprising the electrolyte solution additive for a secondary battery of claim 6.

13. A secondary battery comprising the electrolyte solution for a secondary battery of claim 11.

* * * * *